US008655799B1

(12) United States Patent
Rubin (10) Patent No.: US 8,655,799 B1
(45) Date of Patent: Feb. 18, 2014

(54) ANTICIPATORY LOGISTICS THROUGH SENSOR FUSION AND EVOLUTIONARY MINIMIZATION OF RESPONSE TIME IN AUTOMATED VEHICLES

(75) Inventor: Stuart H. Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 395 days.

(21) Appl. No.: 13/077,442

(22) Filed: Mar. 31, 2011

(51) Int. Cl.
*G06F 15/18* (2006.01)
*G06G 7/00* (2006.01)
*G06F 17/00* (2006.01)
*G06N 5/02* (2006.01)
*G05B 13/02* (2006.01)

(52) U.S. Cl.
USPC ............... 706/8; 706/47; 700/28; 700/50

(58) Field of Classification Search
None
See application file for complete search history.

(56) References Cited

U.S. PATENT DOCUMENTS

| | | | |
|---|---|---|---|
| 5,672,853 A | | 9/1997 | Whitehall et al. |
| 5,767,460 A | * | 6/1998 | Thangavelu ............... 187/382 |
| 5,767,462 A | * | 6/1998 | Thangavelu ............... 187/382 |
| 7,047,226 B2 | | 5/2006 | Rubin |
| 7,840,518 B1 | | 11/2010 | Rubin |
| 2010/0174509 A1 | * | 7/2010 | Raghunathan et al. ........ 703/1 |

OTHER PUBLICATIONS

Srikant, Ramakrishnan, and Rakesh Agrawal. "Mining quantitative association rules in large relational tables." ACM SIGMOD Record. vol. 25. No. 2. ACM, 1996.*

Ovaska, Seppo J. "Modular control system simulator." Simulation 53.4 (1989): 181-185.*
Chaitin, Gregory J., "Randomness and Mathematical Proof", Scientific American, 1975, pp. 47-52, vol. 232, No. 5.
Zadeh, Lotfi A., "From Computing with Numbers To Computing with Words—From Manipulation of Measurements to Manipulation of Perceptions", IEEE Transactions on Circuits and Systems—I: Fundamental Theory and Applications, 1999, pp. 105-119, vol. 45, No. 1.
Liang, Qianhui et al., "Randomization for Testing Systems of Systems", Proc. 10th IEEE International Conference on Information Reuse and Integration, Las Vegas, NV, Aug. 10-12, 2009, pp. 110-114.
Pedrycz, Witold et al., "Numeric Data to Information Granules and Computing with Words", Proceedings of the 2009 IEEE International Conference on Systems, Man and Cybernetics, San Antonio, TX, 2009.

(Continued)

*Primary Examiner* — Kakali Chaki
*Assistant Examiner* — Daniel Pellett
(74) *Attorney, Agent, or Firm* — Kyle Eppele (57) ABSTRACT

Anticipatory logistics is used to predict observable events and respond to the predictions of the observable events in the control of automated equipment that perform highly repetitive functions such as elevator cars. A set of table entries is obtained, and the table entries are metricized and stored as cell entries. All cell entries are normalized. Ten weighted values to the cell entries are initialized. An algorithmically defined subset of weighted values is normalized and an instruction is selected based on the computed dependency using an algorithm incorporating uniform chance selection for exploratory optimization, such as the Mersenne Twister algorithm. Here, the search space is delimited by careful selection of the salient variables as well as by the algorithm itself, which only relies on chance to find truly novel solutions as time (and space) permit. The anticipatory logistics can be used to predict future events such as elevator car usage and thereby enhance efficiency in provision or utilization of resources.

8 Claims, 3 Drawing Sheets

(56) References Cited

OTHER PUBLICATIONS

Lin, Jyh-Han et al., "Complexity Results on Learning by Neural Nets", Machine Learning, 1991, pp. 211-230, vol. 6, No. 3.

Rubin, Stuart H., "Computing with Words", IEEE Transactions on Systems, Man, and Cybernetics—Part B: Cybernetics, 1999, pp. 518-524, vol. 29, No. 4.

Rubin, S.H., "On randomization and discovery", Information Sciences, 2007, pp. 170-191, vol. 177, issue 1.

* cited by examiner

ANTICIPATORY LOGISTICS THROUGH SENSOR FUSION AND EVOLUTIONARY MINIMIZATION OF RESPONSE TIME IN AUTOMATED VEHICLES

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100585.

BACKGROUND

This disclosure relates to automated vehicle control systems and the use of predictive algorithms for operating automated control systems.

SUMMARY

Anticipatory logistics is applied to predict observable events and respond to the predictions of the observable events. A set of table entries is obtained, the table entries are metricized, stored as cell entries, and the cell entries are normalized. An arbitrary number of weighted values to cell entries are initialized for each cell entry. An algorithmically defined subset of weighted values is normalized and an instruction to the automated vehicle control system is selected based on the computed dependency by using an algorithm incorporating uniform chance selection for exploratory optimization.

DETAILED DESCRIPTION

The control of automated equipment that perform highly repetitive functions such as elevator cars using neural networks to predict the next floor that they will be called upon to service is not new. The procedure may be generalized to coordinate multiple pieces of equipment that service a given area. The essential idea was to gather some usage statistics, use the gathered data to train a neural network, and have the elevator cars follow the most likely path as predicted by the neural network. As the predictions associated with the usage patterns change, the neural networks change their predictive output(s) in an effort to construct a fully dynamic system. Unfortunately, the weak link in this operant chain is that the neural networks do not properly generalize the underpinning concepts because for one thing, they are incapable of even simple modus ponens operations. As a result, it is desired to provide a more accurate predictive elevator car algorithm.

The benefits of such an algorithm are clearly illustrated by its effect on reducing the average wait-times for elevator cars on any given floor once the system has been trained. This will also allow reducing the total distance traveled by the elevator cars, thereby minimizing energy usage as well. Also, the training time for the present approach will be quite tractable; whereas, the training time for neural networks having a hidden layer (i.e., modern neural networks) is NP-hard (i.e., intractable).

The techniques described herein extend beyond the application of elevator car control. A capability to more or less accurately predict the demands placed in the future on any server can be applied to a wide variety of applications.

The value of anticipatory logistics is that once a given scenario can be characterized and parametized, it can be simulated. The results of such simulations can be used to train an evolutionary and predictive algorithm. The difference between simulation and evolutionary prediction is that the former addresses the average case, while the latter addresses the most likely case. That difference is profound. For example, on average tomorrow will be a sunny day. Compare that with the prediction that it is ninety percent likely to rain tomorrow. Should one take an umbrella? Averages may be computed in the absence of domain-specific knowledge; whereas, accurate predictions may not be made in the absence of domain-specific knowledge. Consider the classic hotel elevator system, which, for example, consists of three shafts and twelve or more floors. It would be highly inefficient to have all three elevator cars waiting on either the top floor or the lobby, with the exceptions of those times when no one is expected to want to use the elevator car, or all users are anticipated to be on the floor where the elevator cars are waiting. Furthermore, one could evolve a statistical distribution based on parameters such as time of day, which on average maximizes the speed with which an elevator car could be called upon to reach the calling floor.

Such patterns are not random and are properly captured by logging their causality. One elevator car needs to rest on the third floor—not simply because it is 8:00 am, but rather because there is a conference in the hotel today and registration is to be found on the third floor starting at 8:00 am. The domain-specific nature of this problem lies in selecting the best and practical set of variables and features so that knowledge of causality can be captured.

Figure 1:
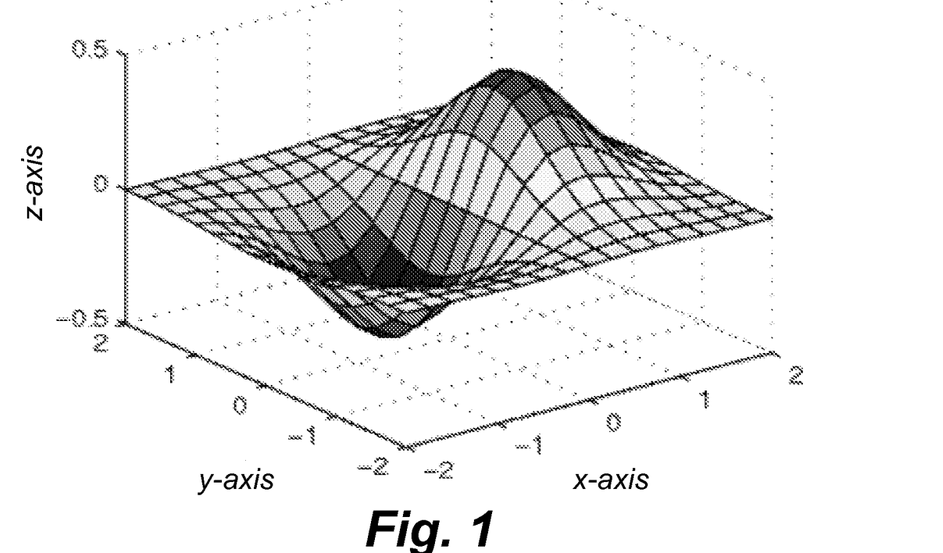
FIG. 1 is a diagram showing graphically any attempt to minimize the waiting time for an elevator car at any given floor the through operation of the program of the present invention.

FIG. 1 is a diagram showing graphically that any attempt to minimize the waiting time for an elevator car at one or nearby floors (shown in the depressed region over the −1 x axis, 0 y axis) will necessarily maximize the waiting time for an elevator car at diametrically opposed floors (shown in the raised region over the +1 x axis, 0 y axis). The situation generalizes to the case for n elevator cars. Here, it is assumed that the number of elevator cars is less than the number of floors. Predictive algorithms tend to dampen the hills (long wait times), but their minimization again is a function of the proper characterization of the underlying causality structure.

Figure 2:
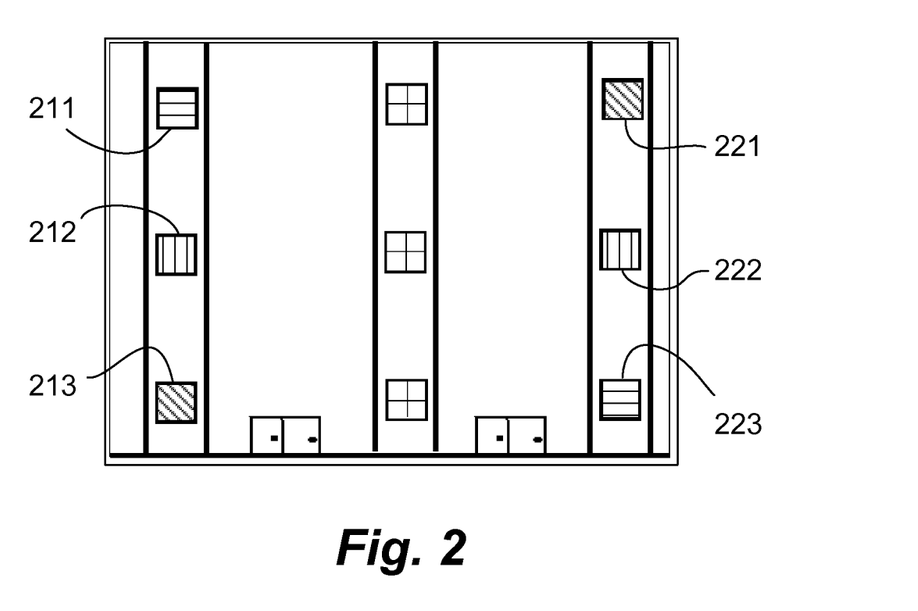
FIG. 2 is a diagram showing the optimal waiting places for two elevator cars for a three floor system when the calling pattern is either random, or a purely statistical approach.

FIG. 2 shows an optimal waiting place for two elevator cars for a three floor system when the calling pattern is random, or purely statistical. The positions are indicated by blocks 211-213 and 221-223. The elevator car use patterns are indicated by different hatch patterns, since they are not unique, and therefore present a non-linear optimization problem. Blocks 211 and 223 with horizontal fill indicate the nearest elevator car, which in this case would be the elevator car located at that particular floor. Blocks 213 and 221 with diagonal fill would be furthest, which would be the opposite extreme floor, and blocks 212 and 222 with the vertical fill representing intermediate distance. These distances correspond to the lowered and raised portions depicted in FIG. 1. It is also noted that changing the anticipated movement of one elevator car will non-linearly affect the anticipated movement of the remaining elevator cars. This example is near a diminutive case, which would be one or two elevator cars servicing two floors.

Another way to figuratively express the problem is as follows. Suppose that for each set of predetermined conditions (features), one were to associate parking or resting floors for each elevator car. Then, in this hypothetical situation, run numerous simulations to find the optimal resting floor for each elevator car. This would yield a set of rules, which would serve to minimize wait times and energy usage, all things considered. This raises the questions as to (1) how to achieve the same results in a tractable manner and (2) which elevator cars to move to which floor so as to maximize the chance of a pickup going in the same direction, while minimizing the mean number of floors traveled and thus saving energy. It should be emphasized that the use of simplifying inter-arrival distributions, which allow for a dynamic programming approach to this problem are enjoined because simplifying assumptions do not capture causality, which is the underpinning determinant of elevator car motion. Then, there is a degree of symmetry too, which is something a neural network is inherently not able to translate. For example, if an elevator car is called to the nth floor, most of the time, the elevator car will ultimately proceed to the lobby or carport (i.e., lower floors). This can properly influence where an elevator car already on the lower floors is sent because the lobby and carport are symmetric exit points for the building.

Finally, the floors may be weighted; although, in some cases, this is unnecessary. That is, someone may be willing to wait longer on the top floor for an elevator car to arrive than on the ground floor. One example of weighting would be where, during peak usage times, successive elevator cars reach capacity on the upper floors and therefore repeatedly skip lower floors. A conventional program which has the elevator cars going to the highest floor calling a down elevator car (or vice-versa) would provide adequate service to people at the highest (or lowest) floors, but cause extended waits for intermediate floors. Also, since elevator cars conventionally respond to calls without regard to predictive activity of the entire elevator car bank, efficiencies are lost where having sequential elevator cars skip calling floors would otherwise speed service to the collective set of users.

Since the elevator cars are being controlled by a programmable control device, it is also possible to move empty elevator cars to desired parking locations in a manner which conserves energy. Thus, if it is determined that a particular elevator car on the 5th floor should park on the 2nd floor, then the movement and acceleration can be optimized for energy efficiency because there are no passengers who would be affected by speed, acceleration or jerk. This occurs after everyone on board exits the elevator car so that there are no pending service requests. Further advantages are seen by improving the efficiency of large building elevator car banks, in which particular elevator cars are assigned to different floors; e.g., elevator cars 1-6 assigned to ground floors and floors 3-30, and elevator cars 7-18 assigned to ground floors and floors 30-50. Instead of the above strict assignments, improved efficiencies can be used to randomly assign the elevator cars according to need, thus providing for system and operational optimization. This increases efficiency in terms of energy efficiency and convenience to users. This also provides better management of elevator car services in avoiding the need for a transfer floor (floor 30 in this example) and possibly improves service to the ground floors.

This has further advantages in elevator car systems in a building having a transfer floor design in which multiple floors are stacked, meaning that a first bank of elevator cars extends from ground floors to a mid-level transfer floor or sky-lobby, and passengers transfer to elevator cars in a second bank from the mid-level transfer floor to an upper floor, and vice-versa. Typically, express elevator cars are assigned to operate between the ground floors and the sky-lobby. Since the system can use operation of connecting elevator cars (the express elevator cars and the upper floor bank) to predict use of elevator cars from the sky-lobby. By providing anticipatory logistics, the number of elevator cars assigned to express service can be varied according to demand.

It is also common in a transfer floor design to provide one or a few elevator cars which extend to all floors (typically designated as freight elevator cars). By using anticipatory logistics, the "freight elevator cars" can be used to selectively provide through service for the upper floors. This further permits providing call signaling in which a user is able to request elevator cars to particular parts of the building.

Figure 3:
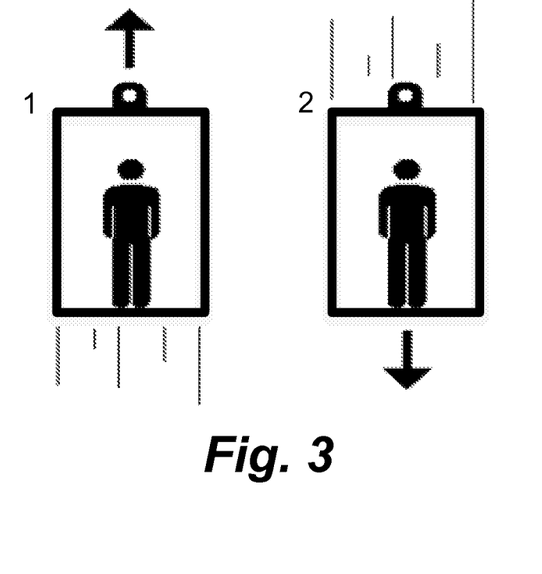
FIG. 3 is a diagram showing a depiction of an elevator car configuration.

The disclosed techniques are intended to save energy and minimize wait times by minimizing the mean distance traveled by each elevator car. FIG. 3 is a depiction of the essential problem; namely, minimize $$\sum_{day=1}^{day=n} \sum_{el=1}^{el=m} |CF_{el} - DF_{el}|,$$

where CF is the current floor for the elth elevator car and DF is the desired floor for the elth elevator car. In particular, a determination is made as to what are the variables or features related to elevator car travel and how the relations among them and the positioning of each elevator car can best be learned and related. For example, suppose that the elevator car attains maximum occupancy (weight) and must leave and thus send another elevator car to the same floor to retrieve the remaining passengers. In that case, the efficiency obtained by sending only one elevator car is lost, because ultimately a second elevator car must be called, with the corresponding increase in wait time for passengers. In this case, the fact that the elevator car attains its maximal weight could be anticipated with more or less accuracy and this would allow for calling two elevator cars to service that floor and thereby saving in at least wait times.

In order to provide improved control, a determination should be made of how one predicts when to move which elevator cars to which floor in order to minimize delays as well as to conserve energy. The answer stems from the well-known operating system principle of temporal locality, or the tendency that if a computer program runs one or a sequence of instructions during one time period, then that instruction or sequence of instructions is more likely to be referenced in the immediate future. It is still necessary to determine just what variables should be sensed in order to be most predictive. Clearly, the time of day better correlates with elevator car movement than, for example, the exterior temperature (in most instances). Moreover, the pattern of calls may be sensed by a breakout from the existing pattern. Indeed, the number and dynamics of the associated variables implies that this problem is necessarily one which involves machine learning, or in other words, an adaptive response.

The system handles two or more people on different floors calling for the elevator car simultaneously or in near simultaneity. This is achieved, not by noting the number of people, but rather by operating strictly off of their signature effects (e.g., selecting that elevator car having to make minimal movement to service both). Such an inherent chaining approach serves to simplify the handling of what might otherwise be perceived to be complex scenarios.

The following is a list of example variables/features, which are deemed to have a high correlation with predicting when a person may call for an elevator car; particularly so in combination with each other. For purposes of this example an arbitrary time period of ten minutes is used, however, the advantages of this process could just as readily be adapted to an infinite number of other arbitrary time periods or list of variables.

1. Average floor number (fractional) calling elevator car in last ten minutes
2. Variance from average floor number calling elevator car in last ten minutes
3. Maximum number of floors separating current location from that of call in the last ten minutes
4. Weighted value (by number of people) floor number calling elevator car in the last ten minutes (counted using an electric eye)
5. Weighted value (by number of people) floor number calling elevator car in the last hour
6. Time of day
7. Day of week—holiday or workday
8. Elapsed time (minutes), since last call for an up elevator car
9. Elapsed time (minutes), since last call for a down elevator car
10. Average number of stops per call in the last ten minutes Again, the energy-saving principle is that if the computer can know exactly where, when, and to what destination the elevator cars will be called upon; then, it can decide which elevator cars to send to where, when, to minimize delays (per person)—thereby keeping the passengers happy as well as saving energy usage, as represented in the above list. Even if the immediate result be suboptimal, the system will learn to converge upon the dynamic best allocation of resources (i.e., elevator cars), where elevator car movement may conclude in preparation for optimization instead of waiting for an elevator car call. Therefore, the elevator system responds to prediction rather than only in response to a call, thereby increasing effectiveness in transporting people. Since the elevator car use is optimized, in many cases, an energy savings is realized.

As computational and sensor technologies become evermore sophisticated, they tend to create a plethora of data. A plethora of data can be useful in some record-keeping applications (e.g., aircraft black boxes), but for the majority of applications one needs to convert volumes of passive data into actionable knowledge (e.g., intelligence). Such knowledge has found applications in logistics, satellite imagery, and in all truly autonomous systems.

The reduction of data to knowledge is time critical because the capability for primary memory storage is currently doubling every 18 months in accordance with Moore's Law. This means that the complexity of information is quadrupling during the same period. The reduction of data to knowledge with or without loss is referred to as randomization. The best way to randomize data for serious applications is to apply knowledge to the randomization process itself. This is termed directed mining by the data mining community and model-based reasoning by others.

Techniques for developing adaptive algorithms are described in S. H. Rubin, *Computing with Words*, IEEE Trans. Syst. Man Cybern. v. 29, no. 4, pp 518-524 (1999). In the manner that towed-sensor arrays employ Markov Chains to enhance the predictive capability of sensed data, the techniques described in Computing with Words can provide a context for extracting meaning from numerical and non-numerical entities alike. For example, there is no purely mathematical technique that can predict that a ship's course will not ground the ship on an intervening island. Using the techniques described in *Computing with Words*, such knowledge can be represented in a way that would not otherwise be possible. Many pieces of knowledge need to be integrated for the optimization of complex predictions (e.g., when and where an elevator car will be called upon and to what destinations). This requires sophistication in representation, which we humans accomplish using the expressive power of natural language. An enormous capability for randomization is thus provided, thereby addressing the focal need. This is combined with statistical analysis, which uses probabilities to rank likelihoods of an event. The techniques described in Computing with Words use possibilities to measure certainties, which while similar to probabilities, are fuzzy by nature. Possibilities need not be abstract and are therefore made useful in the direction of control mechanisms.

Suppose that one were to synthesize a sort function. This is sampled in the following LISP routine:

```
((DEFUN MYSORT (S)
    (COND ((NULL S) NIL)
        (T (CONS (MYMIN S (CAR S)) (MYSORT (REMOVE (MYMIN S (CAR S)) S)))))))
? io
((((1 3 2)) (1 2 3)) (((3 2 1)) (1 2 3)) (((1 2 3)) (1 2 3)))
? (pprint (setq frepos '((CRISPY'
        (DEFUN MYSORT (S)
            (COND
                (FUZZY
                    ((NULL S) NIL)
                    ((ATOM (FUZZY S ((FUZZY CAR CDR) S))) NIL))
                (T (CONS (MYMIN S (CAR S))
                    (MYSORT (REMOVE (MYMIN S (CAR S)) S)))))))))
((CRISPY ' (DEFUN MYSORT (S)
    (COND (FUZZY ((NULL S) NIL) ((ATOM (FUZZY S ((FUZZY CAR CDR) S))) NIL))
        (T (CONS (MYMIN S (CAR S)) (MYSORT (REMOVE (MYMIN S (CARS)) S)))))))
; Note that (ATOM S) was automatically programmed using the large
fuzzy function space.
? (pprint (auto frepos io))
((DEFUN MYSORT (S)
    (COND ((ATOM S) NIL)
        (T (CONS (MYMIN S (CAR S)) (MYSORT (REMOVE (MYMIN S (CAR S)) S))))))
; Note that each run may create syntactically different, but semantically
equivalent functions:
? (pprint (auto frepos io))
((DEFUN MYSORT (S)
    (COND ((NULL S) NIL)
        (T (CONS (MYMIN S (CAR S)) (MYSORT (REMOVE (MYMIN S (CAR S)) S))))))
```

Rather than focus on such details as, "Should I use For i=1 to n−1, or is it n, or is it n+1," and the like, a transformational space of alternative function configurations is set up and the computer is thereby enabled to uniformly cover the search space subject to such I/O constraints as (((3 2 1) (1 2 3)) ((3 1 2) (1 2 3))). That is, when (3 2 1) is input to the sort function, it is required to output (1 2 3). Similarly, when (3 1 2) is input to it, it is required to output the same. Such randomization or compression has an attendant advantage in that it allows for more thorough testing of software components by virtue of their falling on a greater number of execution paths. Moreover, here testing provides the functional definition.

Referring to the above routine, it is certainly easier to specify, for example, For i=1 to [n−1, n+1] than to be exact. Additionally, the validity of the complex software, under any design methodology, is only as good as the testing that it undergoes. By using random-basis testing, while the need for functional decomposition remains, the complexity for the designer is shifted from writing code to writing relatively random tests. The complexity of the former grows non-linearly with scale; whereas, the complexity of the latter is essentially linear with scale.

The test vectors can be dynamically configured by the context of the problem, leading to the automatic synthesis of control rules. Functional testing may be applied to a wide variety of functions, such as, for example, the synthesis of components for controlling the operation of commercial elevator cars, unmanned air vehicles, or autopilot systems.

At the bottom of the above routine, the semantically equivalent can be seen, but with syntactically distinct definitions as compared to MYSORT. Both functions have the same specified I/O behavior and both are instances of the same "fuzzy" program-writing component; however, the synthesized functions can be syntactically distinct.

Given a test suite, it is possible to automatically synthesize a more or less optimal component-based functional program that is in satisfaction of this suite (e.g., see the above routine for an example using the LISP programming language). There are some details requiring attention, such as knowing when a particular sequence will lead to a stack overflow, but data and thus they cannot be effectively trained/scaled up. Consequentially, neural networks are incapable of "computing with words" (using the techniques described in *Computing with Words*), which renders their performance less suited to predicting the proper duty cycle for an assembly of elevator cars. Rather, the present evolutionary approach achieves this through the implementation of a heuristic search and acquisition methodology, which is exemplified in Table 1 below. Again, neural networks cannot do the same because they cannot effect modus ponens, or the capability if given, a→b, and a, then conclude b.

Consider the following schema for the aforementioned ten variables/features. In actuality, each row is sampled each minute to create a cache of ten or so rows. These rows are saved in main memory just in case they are distinct as revealed by a linear search. A first in first out (FIFO) policy is used to maintain the data structure in accordance with the size of primary memory. While a million rows or more can be held in primary memory, that much data would be slow to be attained, would not appreciably improve accuracy or energy savings, and would result in a less complete search of the weight space. Thus, it is estimated that about one thousand rows will suffice. The first dependency here refers to which elevator car to send to the call (e.g., highest floor first if going down; lowest floor first if going up). This means that the predictive system cannot save energy using a single elevator car unless the elevator car is allowed to move other than in response to calls. The second dependency here refers to that elevator cars final resting floor after completing the call. In this example, non-called elevator cars are presumed to already be on their final resting floor to conserve energy.

TABLE 1

| u floor # calling elevator car in last ten min. 0-m (0 = none) | Variance from u floor # in last ten min. 0-10 | Maximum number floors separating current floor from call (10 min) (0-m] | Weighted floor number calling elevator car in the last 10 minutes 1-m | Weighted floor number calling elevator car in the last hour 1-m | Time of day 0-2359 | Day of week - holiday or workday M-FSaSuH | Elapsed time since last call for an up elevator car (mins) 0-1440 | Elapsed time since last call for a down elevator car (mins) 0-1440 | u # stops per call (10 min) 1-m | → | Elevator car # to send to call 1-n | Elevator car's final resting floor 1-m |
|---|---|---|---|---|---|---|---|---|---|---|---|---|
| 2 | 3 | 3 | 1 | 1 | 1400 | H | 5 | 6 | 1 | | 1 | 1 |
| 7 | 4 | 9 | 7 | 4 | 0900 | R | 4 | 2 | 2 | | 3 | 5 |
| 6 | 2 | 5 | 5 | 3 | 0600 | F | 5 | 5 | 2 | | 1 | 2 |
| 8 | 1 | 10 | 8 | 5 | 0800 | H | 2 | 0 | 5 | | 2 | 6 | these are easily resolved using an allowed execution time parameter and impressive programs have been so synthesized. This supports the component-based concept. It is noted that components can be written at any scale given parallel processing support from primitive statements to complex functions. Given only so much allocated search time, the system will either discover a solution or report back with failure. This is in keeping with the recursive unsolvability of the Halting Problem. The Halting Problem is that it is undecidable if an arbitrary program computing an arbitrary input will ever halt.

Neural networks should not be used to control elevator car servicing (or for related logistic problems), where many continuum type factors need to be considered. This relates to a shortcoming of neural network technologies in general. That is, they cannot be expected to perform well on data that is even slightly outside of their training set (unlike humans). Additionally, the fact is that their training time is NP-hard. Therefore, the run time is an exponential function of the size of the Here, the u floor number (listed as "floor #") calling the elevator car in the last ten minutes is the rounded moving average of the floor call buttons pushed (up as well as down) during that period, or u floor $$No. = \frac{1}{\# \, stops} \sum_{i=1}^{\# \, stops} floor_i,$$

where the ith floor is the floor number in the range [1, m (where m equals the number of floors)]. The variance from the u floor # in the last ten minutes is the average of the square of the distance of each data point from the mean, computed using the formula, $$\text{Var(floor)} = \frac{1}{m}\sum_{i=1}^{m}(\text{floor}_i - u)^2,$$

where the floors are uniformly weighted over the short ten-minute period. The maximum number of floors separating the current floor from the call over the last ten minutes is the maximum number of floors the elevator car had to traverse to satisfy any one call during the last ten minutes. The weighted floor number calling the elevator car in the last ten minutes is given by the rounded $$\text{Weighted floor No.} = \frac{1}{\# \text{ stops}} \sum_{i=1}^{\# stops} p_i \cdot \text{floor}_i,$$

where the i floor is the floor number in the range [1, m] and $p_i$ is the number of people getting on at that floor at that stop divided by the total number of people getting on at all floors during the ten minute interval. The weighted floor number calling the elevator car in the last hour is the same as immediately given above for a ten minute interval translated for an hour-long interval. Time refers to the time of day and Day/H refers to the day of the week, where H is the holiday designation. The elapsed time since the last call for an elevator car going up is the rounded number of minutes, since the up button was pressed on any floor. Similarly, the elapsed time since the last call for an elevator car going down is the rounded number of minutes, since the down button was pressed on any floor. The range here is zero to twenty-four hours. The u number of stops per call, over a ten minute interval, refers to the rounded average of the number of stops an elevator car makes from the time when it begins to move until it reverses direction (or is at the bottom or top floors).

The elevator car number (listed as "elevator car #") to send to the call assumes more than one elevator car in the building (else this dependency is omitted), where the number among n elevator cars is sent. The elevator car's final resting floor is the floor [1, m] to which the elevator car is sent after servicing all active calls in its path. Doing so will consume more energy in the immediate term.

Suppose that patron convenience is a hard and fast rule, which will not allow an elevator car to pass a floor it is to service. Now suppose that floors two and three request a down elevator car and that the elevator car is on floor two. Here, a second elevator car is needed to service the third floor, or if a single elevator car, then five floors will be visited. On the other hand, if the single elevator car rests on the third floor, then only two floors will be visited, for a savings of three floors at the cost of one floor (when empty). Simulations will uphold this advantage. The need for a resting floor follows.

The exact number and type of independent and dependent variables used is not deterministic for complex machinery such as an elevator car. It is desired that the independent and dependent variables alike be linearly independent to the extent practical. Each needs to contribute something to the art of predictive accuracy. The number of such variables is limited by the speed and memory capabilities of the processor(s) relative to the speed required by the exercised domain and in some cases the energy draw of the processor to attain the required speed (e.g., a green refrigerator). A first attempt at defining the salient variables was made in Table 1. It may be modified subsequent to testing.

The first row states that the best place to rest one elevator car in the last ten minutes is the 2nd floor. There is a significant variance so this floor number is less binding. It further appears that most calls originated from the first five floors, since the separation is three floors. The weighted calling pattern shows that most people want to go up at the time and day given (i.e., 2:00 pm on a holiday). This pattern is the same for the last ten minutes or the last hour. There has been a five minute interlude for an up elevator car during the last ten minutes and a six minute interlude for a down elevator car during the same period. During the last ten minutes, all elevator cars make an average of two stops before changing direction. Given all this independent information, it is determined that elevator car #1 is to be sent to service the present call(s) and when service has completed, it should be parked on the first floor.

The above example also presumes that the occurrence of the elevator cars reaching maximum capacity before answering a mid-floor call is rare. If the elevator cars frequently must skip floors because of load, then the parking floors would be modified accordingly.

Figure 4:
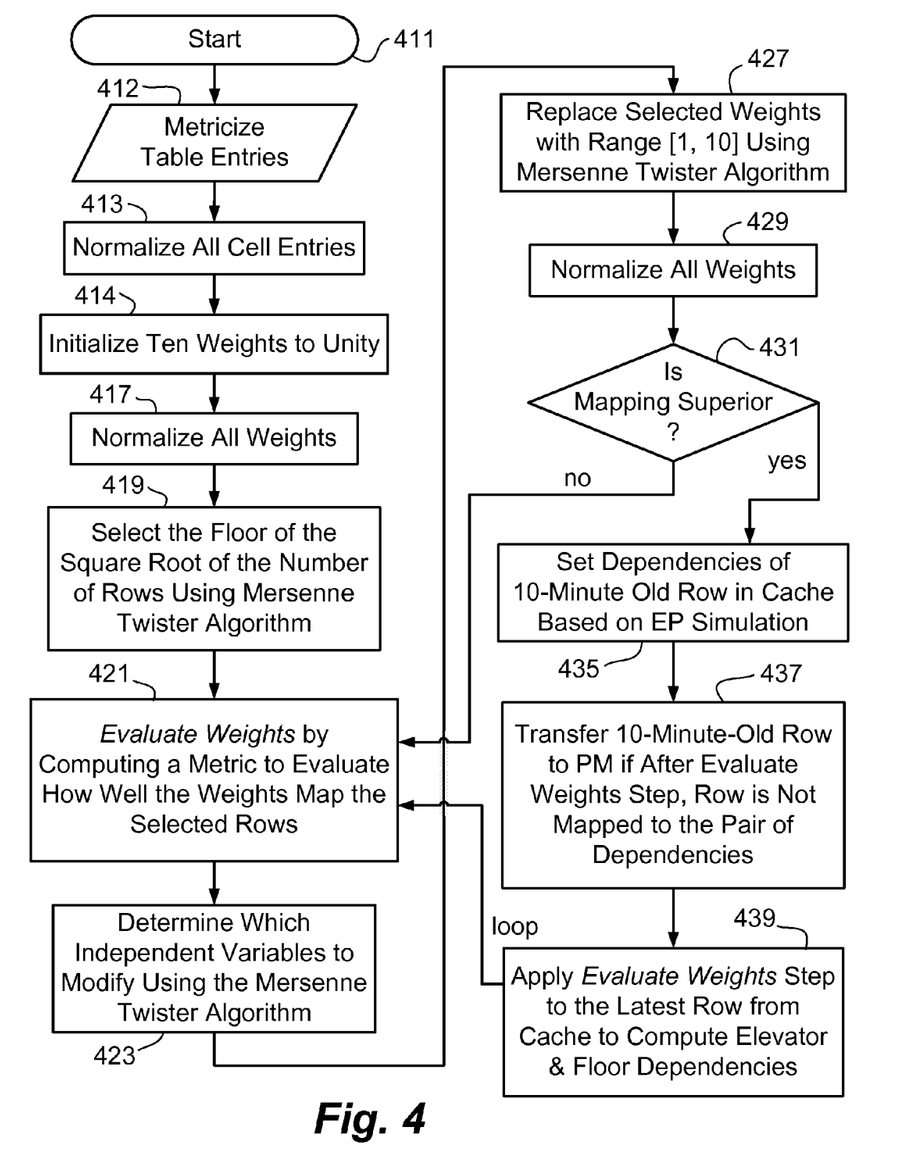
FIG. 4 is a flow diagram showing a sequence for applying anticipatory logistics to predict observable events for and responding to the predictions of the observable events.

FIG. 4 is a flow diagram showing a sequence for applying anticipatory logistics to predict observable events and respond to the predictions of the observable events. An initial set of table entries is obtained. After start (step 411), the table entries are metricized (step 412). All cell entries are normalized (step 413) and an initialization step (step 414) is performed in which ten weighted values are initialized to unity. All weighted values are then normalized (step 417). A selection (step 419) of the floor is made, in which the selected floor of the square root of the number of rows using the Mersenne Twister algorithm. The Mersenne Twister algorithm is a type of Monte Carlo simulation of a random number generator, based on Mersenne primes. The Mersenne Twister algorithm is advantageous in that it produces almost perfectly distributed uniform random numbers with an effectively near infinite period. The Mersenne Twister algorithm is advantageous in that the period of random number generation is large enough not to practically repeat. The metrics are computed to evaluate weighted values (step 421). The evaluation of the weighted values is performed by computing a metric to evaluate how well the weighted values map the selected rows. A determination (step 423) is made as to which independent variables to modify using the Mersenne Twister Algorithm. Weighted values are selected and the selected weighted values are replaced with range [1, 10] using the Mersenne Twister algorithm (step 427).

All weighted values are then normalized (step 429) and if mapping is superior, the evaluate weighted values step and update weight vector steps are repeated (step 431). Dependencies of 10-minute old row in cache based is set (step 435) based on EP simulation. Here, we evaluate a particular allocation among a set of variables and run this allocation to arrive at a metric, which provides a Figure of Merit for that particular allocation. By running multiple simulations, we arrive at a (near) best allocation, which serves as a starting point for improving upon it until improvements, if any, are too small and thus not worth the time to find them. If after the evaluate weighted values step, a row is not mapped to the pair of dependencies, a transfer of a 10-minute-old row to primary memory is made (step 437). An evaluate weighted values step is made (step 439) by applying the evaluation of weighted values to the latest row from cache to compute elevator car and floor dependencies. The evaluate weighted values step (439) and update weight vector steps (423-437) are then repeated.

An issue to be addressed pertains to the training of the system so that the proper dependency values are set on the basis of the independent variable values supplied. One approach is to run a simulation, where evolutionary programming techniques may be used to insure tractability, such that a window time frame is selected (e.g., ten minutes). The window frame reflects processor speed as well as the relevancy of older data. The initial metrics includes historical data, and so it is possible to use the technique to evaluate the worthiness of a candidate problem solution or allocation, with the historical data included among variables. All data (i.e., including historical data) is subject to more or less frequent (e.g., periodic) update. This is done to provide a basis for making the most accurate prediction(s). The surrogate criterion here is to minimize the movement over all elevator cars, while conforming to the rules of passenger pick-up (e.g., an elevator car may not pass a stop call) and satisfying all stop and delivery calls. A local processor will sound a buzzer if the elevator car is attempted to be overloaded so as to eliminate this factor. The evolutionary technique need not find the absolute optimal dependencies because similar patterns will be revisited through elevator car usage. This allows for the use of heuristic/evolutionary techniques, which can be orders of magnitude faster than optimal techniques. Not as much processor power is needed as might at first be assumed. Basically, the idea is to randomly perturb the current best solution (found through the exercise of the algorithm below) again and again until a better solution is found (i.e., in terms of minimizing elevator car movement), or a timer-interrupt fires. The evolutionary search for a better solution does not involve the independent variables; rather, just the dependencies over a time march and a moving cost function based on elevator car selection and that of the resting floor (including the cost of moving to that floor along with the implied savings).

To illustrate the process, consider a three story building serviced by two elevator cars. Consider three successive time intervals, $t_0$, $t_1$, and $t_2$, which represent the last ten minutes of service. (Ten intervals would be proper here, but unnecessarily add to the complexity of illustration.) Initially, at time $t_0$ both elevator cars are on the first floor and a service call is made from the second (going up) and third floor (going to the first). One elevator car is sent to the third floor and returns to the first, where it rests, at a cost of 4 (floors)+1 stop=5. The other elevator car is sent to the second floor to pick up passenger(s), goes to the third floor to drop off the passenger(s), and returns to the first floor at a cost of five. Then, at time $t_1$, assume that again a service call is made from the second (going up) and third floor. Clearly, the cost is again 5+5=10. Finally, at time $t_2$, assume that two calls are received from the second floor going down. Sending two elevator cars to the second floor and returning to the first floor costs 2(3)=6. The overall cost here is 10+10+6=26. Clearly, these are not optimal tours. Below is a process to iteratively improve the tours.

Initially, at time $t_0$ both elevator cars are on the first floor and a service call is made from the second (going up) and third floor (going to the first). The initial resting floor is not subject to mutation, since it lies outside of the ten-minute interval. A single elevator car cannot be used here because it may not pick people up from the second floor and carry them higher because this will result in unacceptable delays on the third floor; nor, may it bypass the second floor and pick it up on the return trip according to the rules of transit. One elevator car is sent to the third floor and returns to the first, where it rests, at a cost of 4 (floors)+1 stop=5. The other elevator car is sent to the second floor to pick up passenger(s), goes to the third floor, and returns to the first floor at a cost of five. Suppose that we send one elevator car to rest on the second floor. This adds one to the former cost. Then, at time $t_1$, assume that again a service call is made from the second (going up) and third floor (going to the first). The reduction here is from ten to five (for a net savings of four so far) using one elevator car. Finally, at time $t_2$, assume that a call is received from two people on the second floor going down. Sending one elevator car from the first to the second floor and returning to the first cost three for an additional savings of three. Overall, these mutations save seven steps, or almost twenty seven percent of the energy, while conforming to the rules of transit. Any result using similar rules, or more floors, and/or more elevator cars is similar. Appealing to Church's Thesis, it follows that evolutionary simulation is a practical technique for elevator car optimization. The methodology for replaying these optimizations follows.

Initially, all weighted values are set to unity. The following presents one example of an evolutionary algorithm for modifying the weighted values:

1. Metricize table entries to enable a differential as previously described.
2. Normalize all cell entries, if any are needed for cold starting. [This serves to prevent, for the same weight, one variable from having an unduly greater numeric sum than another on average.]
3. Initialize the n number of weighted values to unity.
4. Normalize all weighted values.
5. Compare results.
6. Select the floor (square root of the number of rows (SQRT)) at uniform chance using the Mersenne Twister algorithm. Repeat the call if a row would otherwise be selected twice to select r rows. Using the SQRT of the number of rows is not as good as using all of the rows, but is almost as good and 1,000× faster (i.e., $33^2$ vs. $1,000^2$). It can be shown that the SQRT function is optimal in space-time by setting the first derivative to zero and then finding a minimum function (as has been done to compute the optimum number of levels of indirection and rows per level in databases to minimize access time).
7. For each selected row i, compute $$\sum_{j=1}^{10} wt_j \Delta \text{cell}_{i,j},$$

where i is not the current selected cell. That is, compute the weighted sum of how it differs from the cell entry—excepting itself. Find the row having the minimal such sum, resolving ties in favor of the most recent acquisition. If this row has the same (i.e., correct) pair of dependencies as the selected row, add zero, else add |dependency value−correct value| for each incorrect dependency to a running counter initialized to zero. [This running counter forms a global sum, GS, including each of r selected rows. The elevator car number and the floor number are equally weighted as is an elevator car that is too far up and one that is too far down. This stems from the fact that elevator cars are counter-balanced and thus take almost as much energy to move down as up when unloaded.]
8. Generate a uniform random coin toss for each independent variable using the Mersenne Twister algorithm, since it has the best period and is relatively fast. [This determines which independent variables will be modified in an attempt to improve the weighting.]

9. For each independent variable so selected, replace its weight with one in the range [1, 10]. The exact value for replacement is determined by a call to the uniform Mersenne Twister algorithm.
10. Normalize all weighted values.
11. Repeat Step (7) to compute a new GS after saving the preceding weight value. If new GS is less than old GS, then replace the old weight value with the new one.
12. Every minute, a new row along with its associated pair of dependencies, is acquired in cache. If the evolutionary simulator should find for a better pair of dependencies, then the ten minute old row in cache will have its dependencies set accordingly. Otherwise, these dependencies will remain as was.
13. The ten minute old row is transferred to the head of primary memory after normalizing all ten of its cell entries, under a FIFO methodology to make room for it, just in case, using the existing weighted values and Step (7), this set of independents is not mapped to the proper pair of dependencies.
14. Take the latest row from cache, normalize all ten of its cell entries, and apply the existing weighted values and Step (7) to compute a pair of dependencies. These dependencies will determine what elevator car to send to which floor. This is just the actuation step. No learning occurs here.
15. Repeat procedure.

The concept is to modify the weighted values so that an arbitrary row in primary memory will be mapped to some row other than itself having the same dependencies with minimal error. This maximizes the chances that the two dependencies will be proper for state spaces yet to be seen. Every time an elevator car is called (i.e., within a ten-minute window), a new row along with its associated dependencies is acquired in cache. The ten minute old row is transferred to the head of primary memory, under a FIFO methodology, just in case, using the existing weighted values this set of independents is not mapped to the proper dependencies. All variables save the Time and Day/H are metrically evaluated along a continuum. Time is computed using a minute differential and Day/H is computed using a set differential (i.e., T is closer to W than to F and H is closest to Sa and Su).

Additional constraints may be imposed on the system. It may be determined, for example, that a maximum wait should be applied, so that no person would wait more than a predetermined time for the elevator car. The above constraints of people waiting at mid-floors as a result of elevator cars filling to capacity at middle floors can be addressed. In cases where an elevator car service includes mandatory stops, these stops would be coordinated with other elevator car calls, since these are essentially the equivalent.

It is also possible to receive manual or automated instructions regarding service. By way of example, if a meeting is expected to end at a particular time, the system can be given instructions to anticipate elevator car calls from people leaving the meeting. Exterior sensors, such as motion sensors, can be used for the same purpose, so that, for example, activity in a hallway can be used to indicate anticipated need for elevator car service on a particular floor. For example, if a mid-floor meeting and a lower floor meeting end at the same time, the anticipatory logistics can use inputs to recognize that some elevator cars go to the middle floor.

Anticipatory logistics can use historical inputs, such as operation during the predetermined time period or can combine the information with external inputs. External inputs can be obtained from independent sources.

It will be understood that variations in the details, materials, steps and arrangement of parts, which have been herein described and illustrated to explain the nature of the invention, may be made by those skilled in the art within the principle and scope of the invention as expressed in the appended claims.

What is claimed is:

1. Method of applying anticipatory logistics to predict observable events and respond to the predictions of the events in a system that includes automated equipment, the method comprising:
    defining a demand function as a metric;
    establishing a plurality of table entries as cell entries having a set of rows wherein the table entries are comprised of data generated from the automated equipment;
    establishing metrics for the cell entries;
    in the case of the cell entries having variations in scales, normalizing the cell entries;
    normalizing weighted values in the cell entries;
    using a random or pseudo-random number generator producing well-distributed uniform random numbers with a long period to optimize the simulation;
    selecting rows of the cell entries;
    computing a metric to evaluate how well the weighted values map the selected columns in the selected rows;
    using the random number generator, determining which independent variables are most accurately predictive based on back correlations;
    normalizing the weighted values;
    repeating the step of computing a metric to evaluate how well the weighted values map the selected rows;
    setting dependencies of a row based on known data;
    transferring these rows to primary memory if, after repeating the step of computing the metric to evaluate how well the weighted values map the selected rows, the row does not map to the dependencies;
    applying the step of computing the metric to evaluate how well the weighted values map the selected independent rows to a latest row(s), thereby computing dependencies;
    returning to the step of using the random number generator to select an instruction for the automated equipment based on the computed dependencies; and
    using the dependencies as an anticipatory logistics value.

2. The method of claim 1, wherein the random number generator implements a Mersenne Twister Algorithm.

3. The method of claim 1, wherein the automated equipment comprises an elevator system further comprising using the dependencies to select target floor positions of elevator car cars.

4. Method of applying anticipatory logistics to predict observable events and respond to the predictions of the observable events in order to provide instructions, the method comprising:
    collecting a plurality of table entries wherein the table entries are comprised of data generated from the observable events;
    metricizing the table entries to enable a differential and storing the metricized table entries as cell entries;
    in the case of cell entries having different weighted values, normalizing all cell entries;
    initializing all weighted values to unity;
    normalizing all weighted values;
    selecting an instruction based on the computed dependencies using an algorithm providing a uniform chance selection;
    effecting a row selection i;

for each selected row i, computing a weighted sum of how the row differs from the cell entry excepting itself;

identifying the row having the minimal weighted sum, resolving ties in favor of the most recent acquisition;

in the case of a row having the same set of dependencies as the selected row, adding zero, else adding |dependency value−correct value| for each incorrect dependency to a running counter initialized to zero, the running counter thereby forming a global sum including each of r selected rows;

generating a uniform random coin toss for each independent variable using the Mersenne Twister algorithm to determine which independent variables to modify;

for each independent variable so selected, replacing its weighted value with one in the range of one to ten determined by a call to the uniform Mersenne Twister algorithm;

normalizing all weighted values;

repeating the sequence of computing a weighted sum to compute a new global sum including each of r selected rows after saving a preceding weight vector, and in the case of the new global sum the old global sum, replacing the old weight vector with the new one;

repeating the sequence with new dependencies, while deleting corresponding oldest dependencies;

taking the latest row from cache, normalize all cell entries, and apply the existing weighted values and computing a weighted sum to compute a set of dependencies, thereby determining a response based on the set of dependencies.

5. The method of claim 4, further comprising:

selecting the instruction based on the computed dependencies simulated using uniform chance using the a random number generator algorithm producing well-distributed uniform random numbers with a long period, using the computed dependency.

6. The method of claim 4, further comprising:

selecting the instruction based on the computed dependencies at uniform chance using the Mersenne Twister algorithm.

7. The method of claim 4, further comprising:

for each selected row i, computing a weighted sum of how the row differs from the cell entry excepting itself, by computing $$\sum_{j=1}^{10} wt_j \Delta \text{cell}_{i,j},$$

where i is not the current selected cell.

8. The method of claim 4, wherein the instruction is applied to an elevator system, further comprising using the dependencies to select target floor positions of elevator car cars.

* * * * *